United States Patent [19]
Gassner

[11] 3,768,129
[45] Oct. 30, 1973

[54] FRICTION ROLLER FOR DRIVING HIGH-SPEED SPINNING OR TWISTING TUBE

[75] Inventor: Hans Gassner, Schweinfurt, Germany

[73] Assignee: Kugelfischer Georg Schafer & Co., Schweinfurt, Germany

[22] Filed: Mar. 21, 1972

[21] Appl. No.: 236,796

Related U.S. Application Data
[62] Division of Ser. No. 685, Jan. 5, 1970, Pat. No. 3,673,897.

[30] Foreign Application Priority Data
Jan. 4, 1969 Germany............... P 19 00 402.5

[52] U.S. Cl................................. 29/110, 57/77.45
[51] Int. Cl.......................................... B21b 27/00
[58] Field of Search............................. 29/110, 132; 57/77.45

[56] References Cited
UNITED STATES PATENTS
3,465,509  9/1969  Parker et al........................ 57/77.45
3,613,467  10/1971  Lee................................. 57/77.45 X

*Primary Examiner*—Alfred R. Guest
*Attorney*—Stevens, Davis, Miller & Mosher

[57] ABSTRACT

A friction roller and a method for producing a friction roller suitable for driving a spinning or twisting tube at high rotational speeds, the roller having tube-engaging driving surfaces formed of a wear-resistant resilient synthetic resin (such as polyurethane), the method comprising finishing the driving surfaces of the roller by machining them while the roller is being rotated at the maximum expected driving speed, which may be of the order of 30,000 to 40,000 r.p.m.

7 Claims, 4 Drawing Figures

FRICTION ROLLER FOR DRIVING HIGH-SPEED SPINNING OR TWISTING TUBE

This is a division of application Ser. No. 000,685 filed Jan. 5, 1970, now U.S. Pat. No. 3,673,897.

This invention relates to improvements in friction rollers for driving high-speed spinning or twisting tubes. More particularly, this invention relates to friction rollers which have driving surfaces for engagement with the tube and which are formed of a wear-resistant resilient synthetic resin.

Such friction rollers are already known, and they have been used satisfactorily for driving spinning or twisting tubes at speeds of up to about 300,000 r.p.m. However, with higher rotational speeds, especially speeds up to at least 600,000 r.p.m., it has been found that the tube runs irregularly and vibrates which results in variations in its rotational speed which depart from that speed which is required.

Investigations have shown that when such friction rollers are used at these higher rotational speeds, the driving surfaces made of wear-resistant resilient synthetic resin deform or deflect so that the configuration of the driving surfaces is non-cylindrical. Although the driving surfaces of these rollers may be machined to give an extremely fine and accurate surface finish, it has not heretofore been possibe overcome the above-mentioned problem.

Consequently, the use of friction rollers having driving surfaces of a wear-resistant resilient synthetic resin, especially those made of polyurethane, cannot be contemplated for such relatively high rotational speeds.

An object of the present invention is to provide a method for producing a friction roller of the kind previously referred to, but having a special finishing step for the driving surfaces in order to overcome the aforementioned problems.

A further object of the invention is to provide a particular form of friction roller having driving surfaces which are of a configuration suitable for driving a spinning or twisting tube, such as a falst twist tube, at extremely high rotational speeds.

Accordingly, the present invention provides a novel method for producing a friction roller suitable for driving a spinning or twisting tube at very high rotational speeds, the roller having driving surfaces for engagement with the tube which are formed of a weatresistant resilient synthetic resin, the method comprising finishing the driving surfaces of the roller by machining them while the roller is rotated at the maximum expected driving speed.

Furthermore, the present invention also provides a novel friction roller suitable for driving a spinning or twisting tube at high rotational speeds and comprising a body having driving surfaces formed of a wear-resistant resilient synthetic resin, the driving surfaces having a configuration such that when the roller is rotated at the desired very high driving speeds the driving surfaces are cylindrical, but when the roller is stationary the driving surfaces are non-cylindrical.

By way of example, the present invention will now be described with reference to a preferred embodiment depicted in the accompanying drawing wherein.

Figure 1:
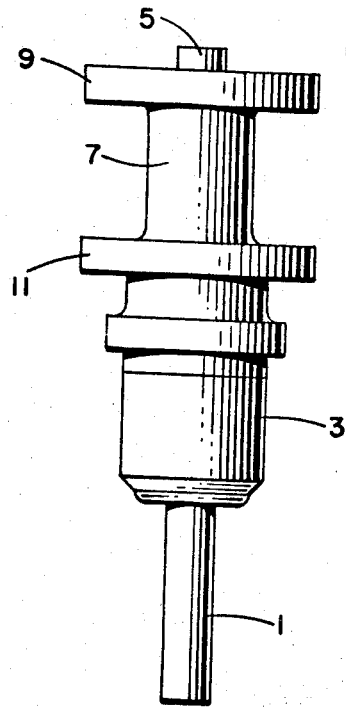
FIG. 1 is a plan view of a friction roller mounted on a driving spindle.

Referring to FIG. 1 of the accompanying drawing, a spindle 1 is mounted for rotation in a housing 3 containing roller bearings. A friction roller body is mounted on one end 5 of the spindle 1 by press fitting. The friction roller body 7 includes axially spaced apart flanges which provide driving surfaces 9, 11.

The body 7 is made of a wear-resistant resilient synthetic resin, and preferably polyurethane. The body 7 is machined to the required configuration when it is mounted on the spindle 1. This is necessary because of the high degree of accuracy required for the driving surfaces 9, 11 of the body 7 necessary for driving high-speed spinning or twisting tubes such as, e.g., false twist tubes.

Hitherto, this machining has been carried out while rotating the roller body at the normal relatively low speeds which are conventionally used for turning or grinding processes. These normal rotational speeds are substantially lower than the actual running speeds of the friction roller while driving the spinning or twisting tube with which it is in engagement.

Figure 3:
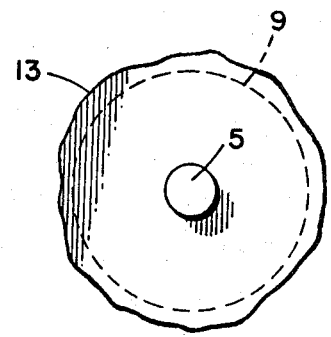
FIG. 3 is an end view of a roller produced in the conventional manner, and of conventional form. The solid line depicts the configuration of the driving surfaces when the roller is rotated at extra high speeds of revolution, and the dashed line depicts the configuration of the periphery when the roller is at rest.
Figure 2:
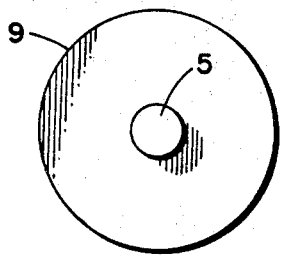
FIG. 2 is an end view of the friction roller depicted in FIG. 1.

With particular reference to FIG. 3, a friction roller prepared and machined in this conventional manner will have a truly cylindrical surface 9 when the friction roller is at rest. However, when the friction roller is rotated at the operating speed of 30,000 to 40,000 r.p.m., as is necessary for driving the spinning or twisting tube at the desired speeds of up to 600,000 r.p.m., the driving surface does not retain its exact geometrical cylindrical shape because of the deformation or deflection of the wear-resistant resilient synthetic resin. The configuration of the driving surfaces at such high rotational speeds of the friction roller is indicated by the line 13. It is believed that this deformation or deflection of the driving surface is a consequence of the unavoidable inhomogenity of the synthetic resin.

It will be appreciated that the configuration of the periphery 13 is unsuitable for driving spinning or twisting tubes at extra high speeds because of the vibrations which would be set up in the twisting tube when driven by such an irregular configuration.

Figure 4:
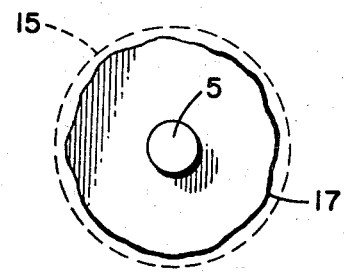
FIG. 4 is an end view similar to FIG. 3 of a roller made and having a configuration in accordance with the present invention. In this instance, the dashed line depicts the configuration of the periphery of the roller at extra high speeds of revolution, and the solid line depicts the configuration of the periphery when the roller is at rest.
Figure 5:
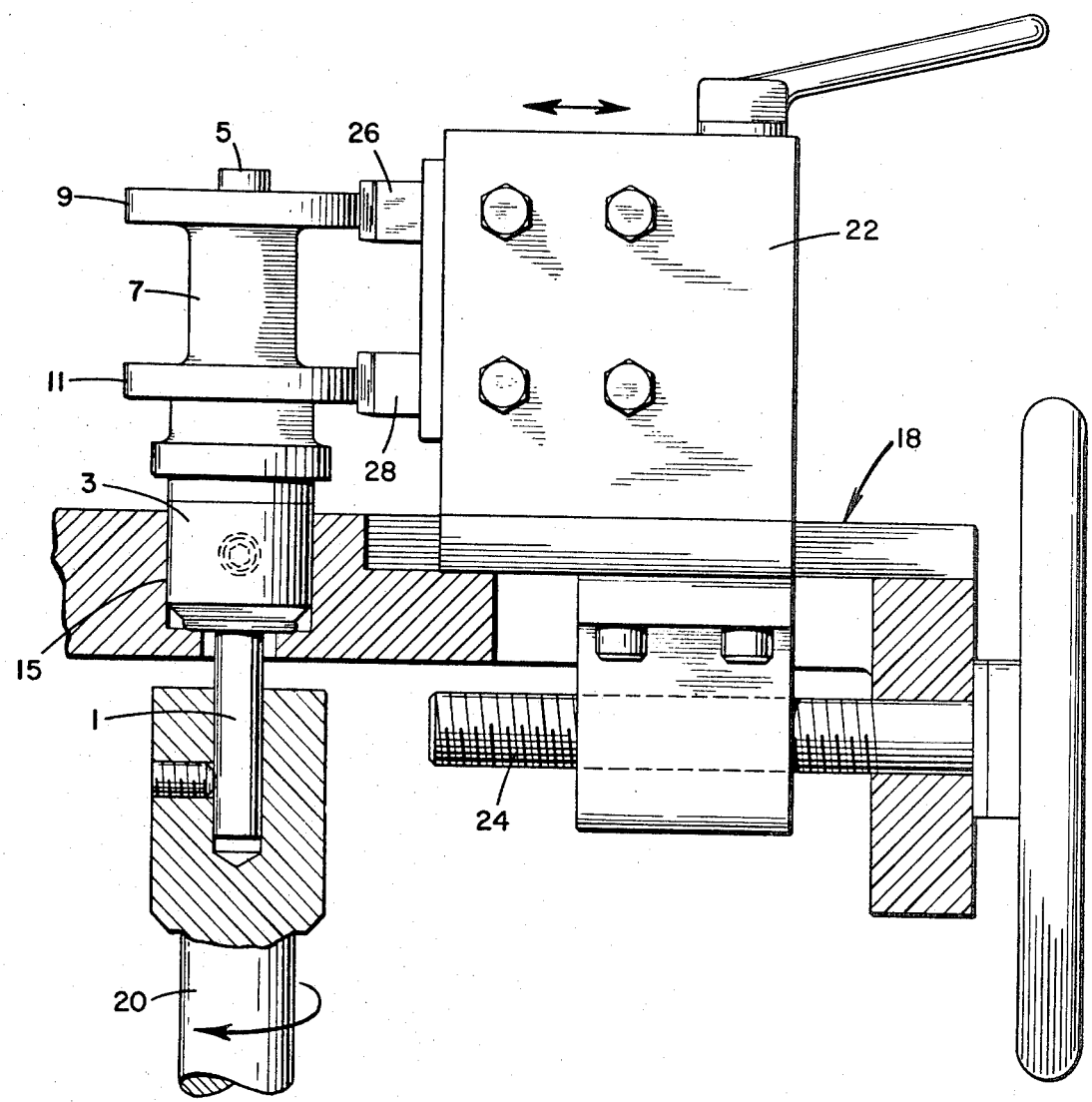

With reference to FIG. 4, the driving surface 15 has an exact geometrical cylindrical configuration at the operating speed of 30,000 to 40,000 r.p.m., and the configuration of the driving surface 17 when at rest is of non-cylindrical configuration. The peripheral configuration of the driving surface when at rest is of smaller diameter than when the roller is rotated at such very high rotational speeds.

The configuration of the driving surface depicted in FIG. 4 is obtained by subjecting the friction roller to a finishing machining operation in which a diamond tool or the like machines the driving surface while it is rotating at the maximum running speed to be expected, for example at the 30,000 to 40,000 r.p.m. aforementioned. It will be appreciated that when the friction roller is rotated at such very high speeds while being machined, any non-uniform raised portions of the driving surfaces which only become apparent at such very high speeds will be removed and the roller is thus machined in the rotating stressed condition to which it will be subjected while in use, and therefore the driving surfaces are, under such corresponding operating conditions, machined to give the exact cylindrical configuration that is required for optimum results during subsequent use.

Accordingly, the present invention enables friction rollers having driving surfaces made of a wear-resistant resilient synthetic resin material to be produced and to be used for the very high rotational operating speeds of 30,000 to 40,000 r.p.m. or even more The problems afore-mentioned arising from vibrations in the spinning or twisting tubes are thus overcome, and this enables false-twisting spinning machines to be operated at much higher rotational speeds than has been heretofore possible.

What is claimed is:

1. A friction roller suitable for driving a spinning or twisting tube at very high rotational speeds and comprising a body having driving surfaces of a wear-resistant resilient synthetic resin, said driving surfaces having a configuration which was obtained by machining them while the roller was being rotated at the maximum expected driving speed whereby the said surface is exactly cylindrical when the roller is rotated at the said driving speed.

2. A friction roller according to claim 1 in which the body is formed of polyurethane.

3. A friction roller according to claim 2 in which the body includes a pair of axially spaced flanges of which the peripheries constitute the driving surfaces.

4. A friction roller adapted for rotating a tube at very high rotational speeds comprising a wear-resistant resilient synthetic resinous surface which is cylindrical at the maximum speed said roller is driven, said cylindrical surface having been machined until cylindrical while the roller was being rotated at its maximum expected driving speed.

5. The friction roller of claim 4 having a body and an annular flange adjacent each end of the body, the surfaces of the flanges combining to provide the said driving surface.

6. The friction roller of claim 5 wherein the resin is polyurethane.

7. The roller of claim 4 having a spindle, a roller body press fit on the spindle, axially spaced annular flanges carried by said body having surfaces which combine to form the said driving surface.

* * * * *